US007517151B2

(12) United States Patent
Leone et al.

(10) Patent No.: US 7,517,151 B2
(45) Date of Patent: Apr. 14, 2009

(54) SEALABLE ARTICLE CONTAINER

(76) Inventors: Daniel E. Leone, 1825 Gildenborough Ct., Midlothian, VA (US) 23113; Christopher A. Leone, 1825 Gildenborough Ct., Midlothian, VA (US) 23113

( * ) Notice: Subject to any disclaimer, the term of this patent is extended or adjusted under 35 U.S.C. 154(b) by 252 days.

(21) Appl. No.: 11/346,637

(22) Filed: Feb. 3, 2006

(65) Prior Publication Data

US 2007/0183689 A1 Aug. 9, 2007

(51) Int. Cl.

| | |
|---|---|
| ***B65D 33/06*** | (2006.01) |
| ***B65D 33/30*** | (2006.01) |
| ***B32B 9/00*** | (2006.01) |
| ***B32B 33/00*** | (2006.01) |

(52) U.S. Cl. .................. 383/90; 383/6; 383/7; 383/10; 383/11; 383/210; 383/211; 383/88; 428/40.1

(58) Field of Classification Search ................ 428/40.1; 383/4, 6, 7, 10, 11, 14, 15, 37, 210, 210.1, 383/211, 61.1, 61.2, 63, 88, 90, 105, 117, 383/127; D34/1, 4; D3/20

See application file for complete search history.

(56) References Cited

U.S. PATENT DOCUMENTS 2,514,316 A * 7/1950 Dobrin ....................... 160/102
2,766,797 A 10/1956 Cowen
4,602,664 A 7/1986 Hullen
5,092,681 A 3/1992 Ashley
5,347,789 A * 9/1994 Weder ......................... 53/397
5,417,462 A 5/1995 Hensley
5,479,761 A * 1/1996 Weder ......................... 53/461
5,524,423 A 6/1996 Haley
5,625,979 A * 5/1997 Weder ........................... 47/72
5,664,886 A 9/1997 Hutchinson
5,713,980 A 2/1998 Tierney
5,722,220 A 3/1998 Greenland
D394,929 S * 6/1998 Ahumada ..................... D34/1
5,820,958 A * 10/1998 Swallow .................... 428/42.2

* cited by examiner

*Primary Examiner*—Patricia L Nordmeyer
(74) *Attorney, Agent, or Firm*—Hammer & Associates, P.C.

(57) ABSTRACT

A sealable article container which comprises a flat material having a peripheral edge portion around an outer edge of the material, and binding means, the binding means being located in the peripheral edge portion. The flat material is made of a plastic film, paper sheet, cloth, netting, or mesh. The binding means is selected from the group consisting of: double-backed tape, tongue and groove strips, hook and loop sealing strips, adhesives, or the like. In operation the flat material is placed upon a surface with the binding means facing up, and an article or multiple articles being placed upon the flat material and within the binding means, and thereafter the flat material being folded upon itself so that binding means seals with binding means to form a container for the article or multiple articles.

7 Claims, 6 Drawing Sheets

SEALABLE ARTICLE CONTAINER

BACKGROUND OF THE INVENTION

The present invention provides a sealable article container.

Articles which are not of a standard size or multiple articles which may be of a standard size or multiple articles which are not of a standard size can pose a problem when it comes to collecting and assembling these articles into a container. An example of multiple articles which are not of a standard size is refuse.

Refuse pick up can be a difficult task. For example, for leaf or yard debris pick up, most people use a plastic garbage bag, however if someone is working alone, it is often difficult to open the bag while placing the refuse inside the bag. Some people may use a device which keeps the bag open, such as a garbage can, but then it can be difficult to extract the bag from the can once it is filled with refuse.

Devices are known that use a sheet with a cord or draw string as taught by U.S. Pat. Nos. 2,766,797, 5,092,681, 5,417,462 and 5,713,980. Other debris capturing apparatus are taught by U.S. Pat. Nos. 4,602,664, 5,524,423, 5,664,886 and 5,722,220.

SUMMARY OF THE INVENTION

A sealable article container which comprises a flat material having a peripheral edge portion around an outer edge of the material, and binding means, the binding means being located in the peripheral edge portion. The flat material is made of a plastic film, paper sheet, cloth, netting, or mesh. The binding means is selected from the group consisting of: double-backed tape, tongue and groove strips, hook and loop sealing strips, adhesives, or the like. In operation the flat material is placed upon a surface with the binding means facing up, and the article or multiple articles, such as debris, being placed upon the flat material and within the binding means, and thereafter the flat material being folded upon itself so that binding means seals with binding means to form a container for the article.

BRIEF DESCRIPTION OF THE DRAWINGS

The foregoing will become more readily apparent by referring to the following detailed description and the appended drawings in which.

DETAILED DESCRIPTION OF THE INVENTION

Figure 1:
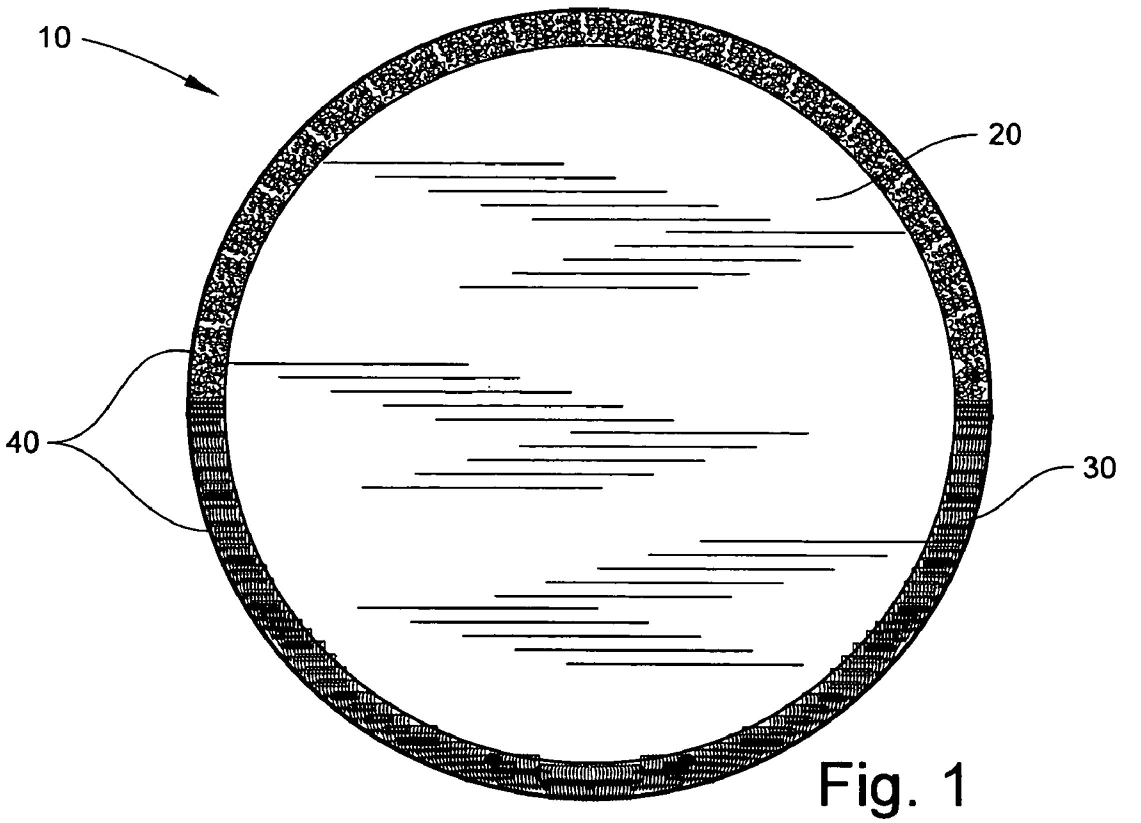
FIG. 1 is a top plan view of a sealable article container.
Figure 2:
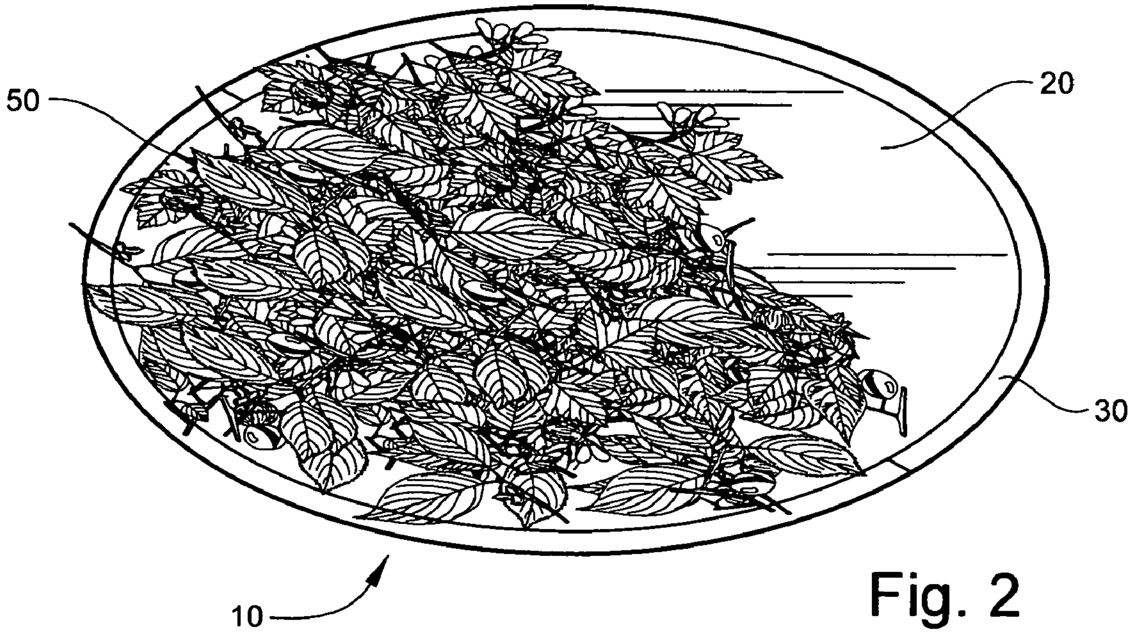
FIG. 2 is a top plan view of a sealable article container shown with debris on the flat sheet.
Figure 3:
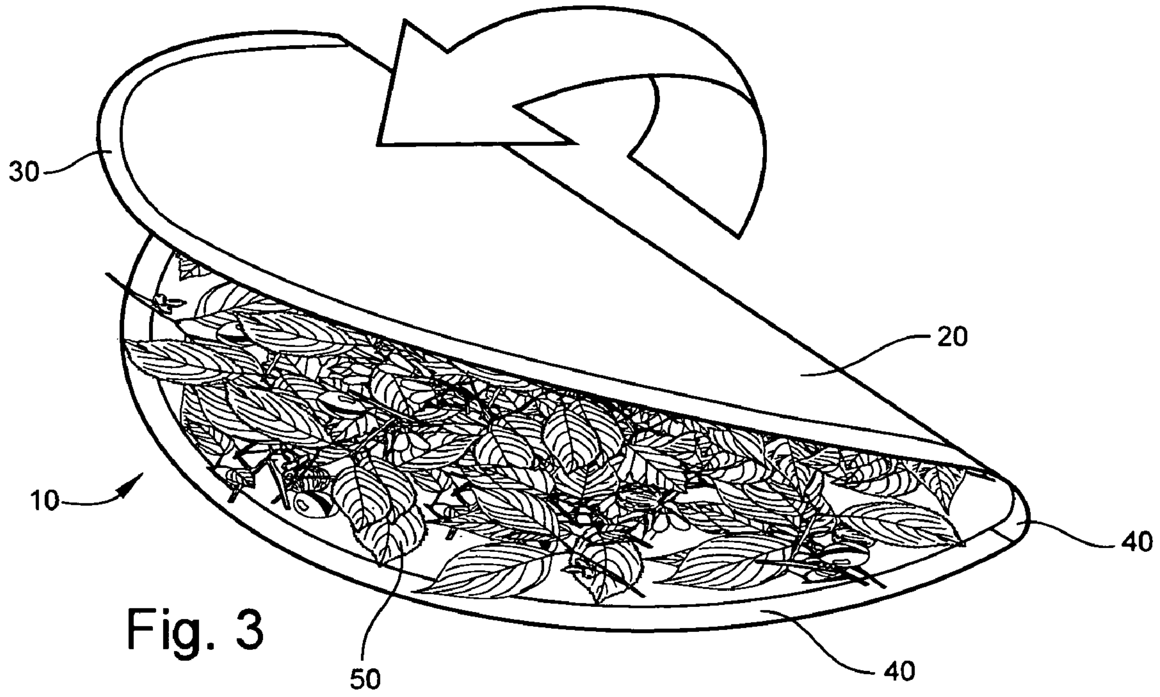
FIG. 3 is a view of the sealable article container shown as it is being folded for closure.
Figure 4:
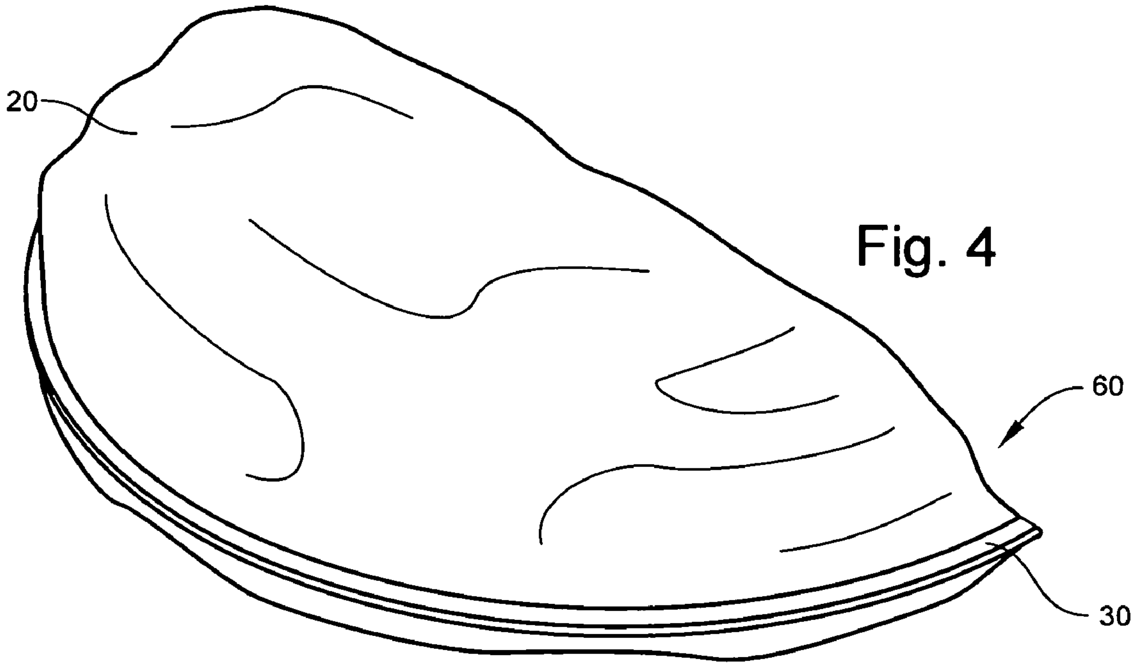
FIG. 4 is a view of the sealable article container shown after closure.

A sealable article container 10, FIG. 1, which comprises a flat material 20 having a peripheral edge portion 30 around an outer edge of the material 20, and binding means 40, the binding means 40 being located in the peripheral edge portion 30. In operation the flat material 20 is placed upon a surface with the binding means 40 facing up, then the article or multiple articles, such as debris 50, FIG. 2, is placed upon the flat material 20 and within the binding means 40, and thereafter the flat material 20 is then folded upon itself, as shown in FIG. 3, so that binding means 40 seals with binding means to form a container 60, FIG. 5, for the article, such as debris 50.

The flat material 20 can made of a plastic film, paper sheet, cloth, netting, or mesh. The flat material may be of any size or any shape. Examples of some different shapes can be seen in FIGS. 1, 2, 9 and 13. While any shape may be used, it is preferred to use a geometric shape that forms a mirror image with itself to facilitate closing using the binding means 40. Therefore circles, ovals, rectangles, squares, hexagons and octagons all tend to work well in this application. The thickness should be suitable for serving the function of acting as a container for article or multiple articles once the sheet is folded onto itself and sealed. This flat material may also be elongated.

If the flat material 20 is a plastic film it may be polymeric based such as polyethylene, polypropylene, nylon, polyester, polyurethane or polyethylene terephthalate. This plastic film may be either transparent or opaque. If a plastic film is used it may be a single or multilayered and may be made of the same or different film materials which are suitable to the end use application. If the flat material is multilayered the layers may be made of different materials which are joined together, an example would be a net or webbing bonded to a plastic film, fabric material or a paper.

The flat material 20 may also be cloth in the form of a woven fabric, a knitted fabric or a non-woven fabric. The cloth may come from a polymeric or cellulosic source. The cloth is made from a fiber selected from the group of: natural fibers, synthetic fibers or combinations thereof. Examples of natural fibers include cotton, wool, flax, hemp or silk. Examples of synthetic fibers include acrylic, nylon, polyester, polyethylene, polyurethane and polyvinyl fibers. Synthetic fibers may also include transformed natural polymers such as acetates and rayons. The cloth material may be a single or multilayer of the same or different film materials which may be either woven or non-woven. This flat material 20 may be a paper or a foil. This paper or foil may be colored or decorated so as to serve as a wrapping paper. Any of the materials which are listed as examples of the flat material may be made of recycled or virgin material or some combination thereof.

Figure 9:
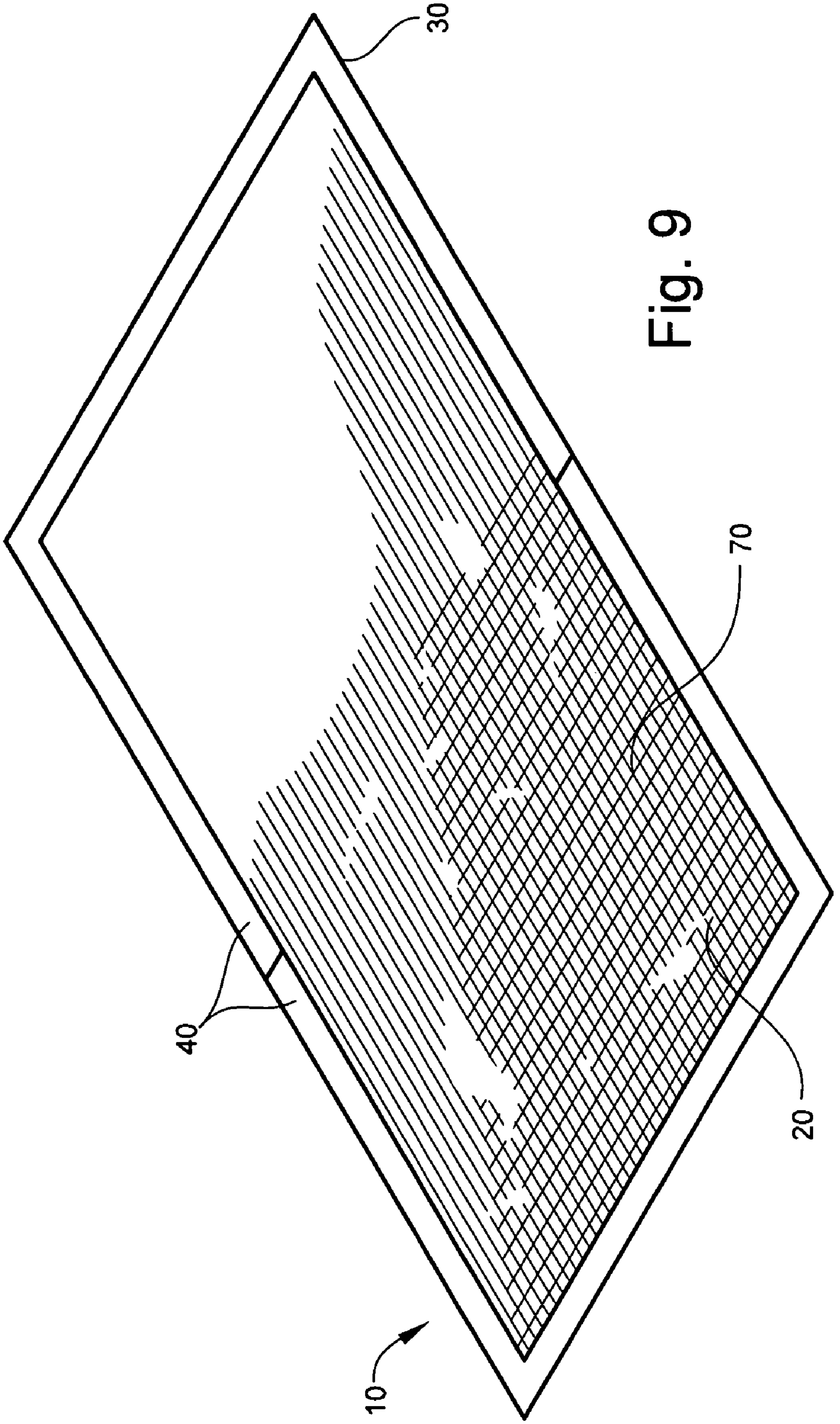
FIG. 9 is a perspective view of an alternative sealable article container.

The flat material 20 may also be cloth in the form of a netting 70, FIG. 9. The netting may come from a polymeric or cellulosic source. The netting is made from a fiber selected from the group of: natural fibers, synthetic fibers or combinations thereof. Examples of natural fibers include cotton, wool, flax, hemp or silk. Examples of synthetic fibers include acrylic, nylon, polyester, polyethylene, polyurethane and polyvinyl fibers. Synthetic fibers may also include transformed natural polymers such as acetates and rayons. The netting material may be a single or multilayer of the same or different film materials.

The flat material 20 may also be cloth in the form of a mesh fabric. This is a fabric which is characterized by open spaces between the yarns. The mesh may come from a polymeric or cellulosic source. The mesh may be made from a fiber selected from the group of: natural fibers, synthetic fibers or combinations thereof. Examples of natural fibers include cotton, wool, flax, hemp or silk. Examples of synthetic fibers include acrylic, nylon, polyester, polyethylene, polyurethane and polyvinyl fibers. Synthetic fibers may also include transformed natural polymers such as acetates and rayons. The mesh material may be a single or multilayer of the same or different mesh materials.

The flat material 20 as discussed in the paragraphs above may include a webbing or a netting laminated in a plastic sheet. An example of such a material is a product which is referred to as a blue tarp. This material generally has a top coating made from a weather resistant polyethylene coating, with a high density polyethylene weave and a bottom coating made from a weather resistant polyethylene coating. The weave can have any structure but one which is readily available has 8 strands vertically and 8 strands horizontally of the high density polyethylene per square inch or per 2.54 cm square. These tarps are available commercially from Harp's Tarps which can be located at www.harpstarps.com.

Figure 5:
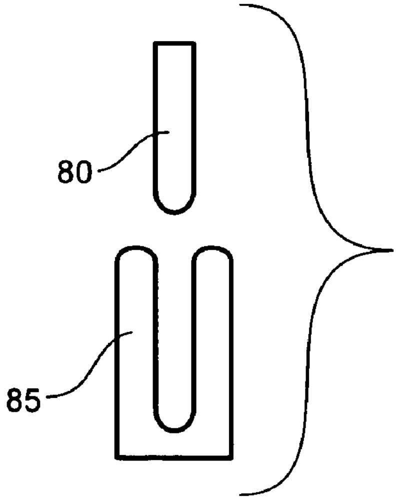
FIG. 5 is a cut away view of the tongue and groove closure means for the sealable article container.
Figure 7:
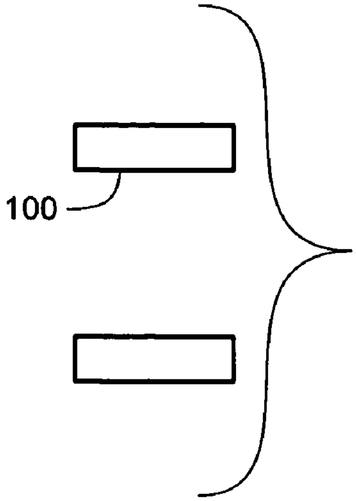
FIG. 7 is a cut away view of the tape or adhesive closure means for the sealable article container.
Figure 6:
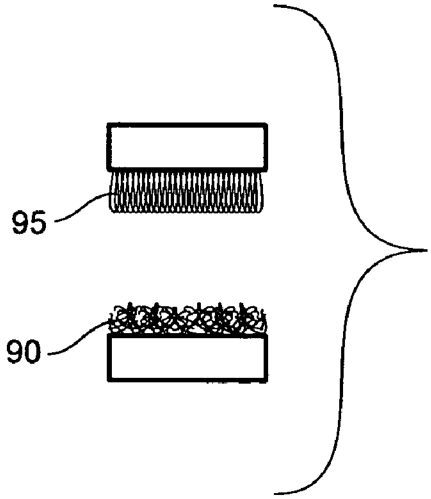
FIG. 6 is a cut away view of the hook and loop closure means for the sealable article container.
Figure 8:
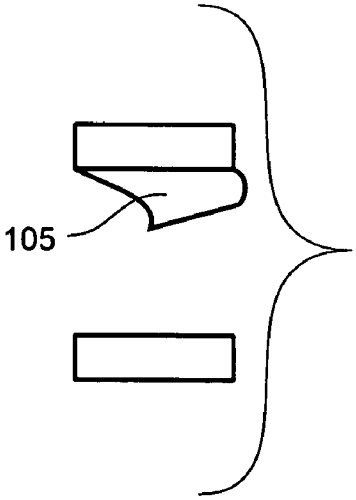
FIG. 8 is a cut away view of and alternative adhesive or tape means for the sealable article container.

The binding means 40 may be selected from the group consisting of: double-backed tape FIG. 8, tongue 80 and groove strips 85, FIG. 5, hook 90 and loop 95 sealing strips, FIG. 6, adhesives 100, FIG. 7, or the like. If double-backed tape or adhesive is used it might also include a releasable strip 105 which protects the adhesive coating or tape prior to use. The adhesive or tape may be applied directly to the peripheral edge portion 30 to form the binding means 40.

Figure 10:
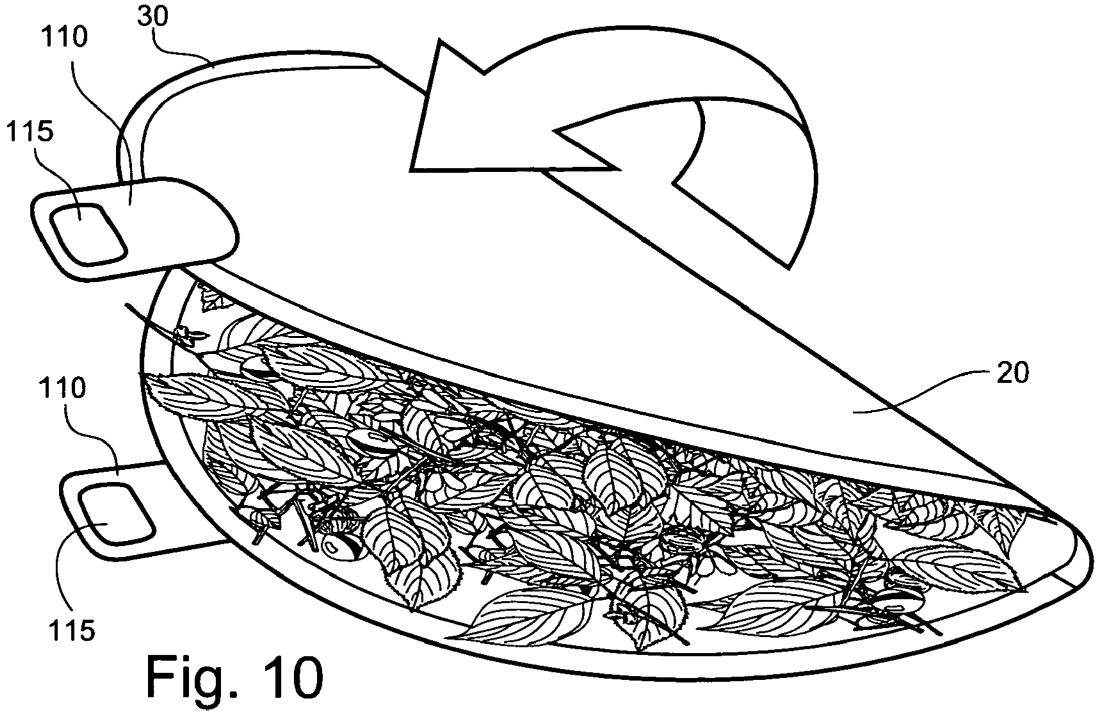
FIG. 10 is a view of an embodiment of the sealable article container, having tabs, shown as it is being folded for closure.
Figure 11:
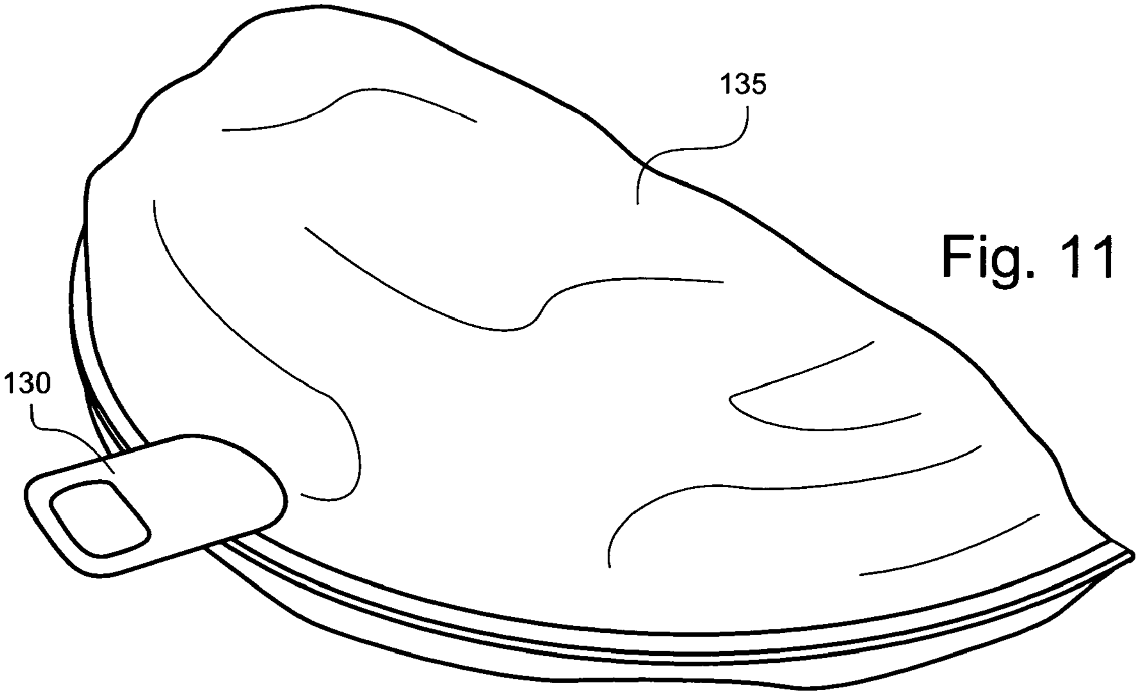
FIG. 11 is a view of the sealable article container with tabs shown after closure.
Figure 12:
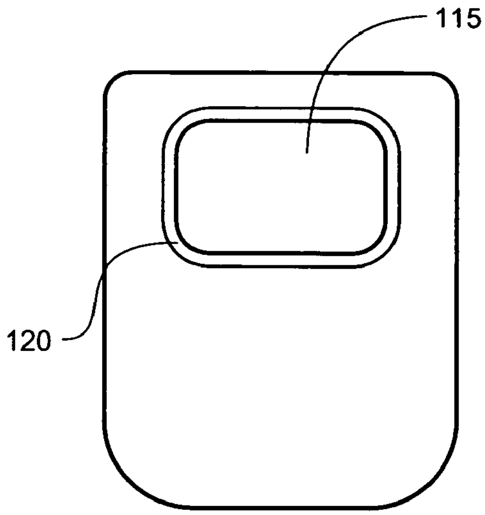
FIG. 12 is a top plan view of a tab for the sealable article container.
Figure 13:
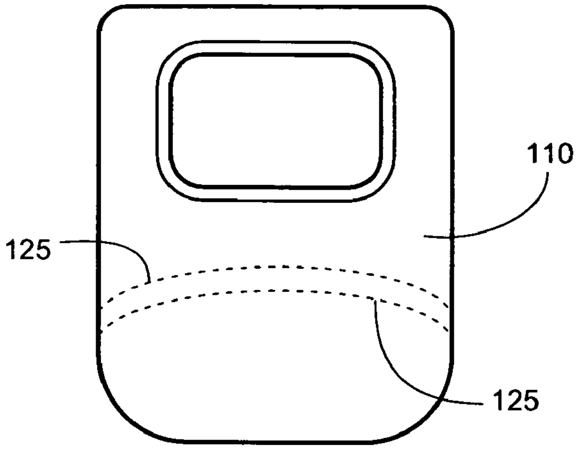
FIG. 13 is a top plan view of another tab for the sealable article container.

In one of the embodiments of the invention there can be a set of tabs 110, FIG. 10 added to the peripheral edge portion 30, which are fitted with matching apertures 115, which when closed form a handle 135 which can be used to pick up and transport the container 135, FIG. 11. The tabs 110 may also overlap the flat material 20 to add strength. These tabs 110, FIG. 13 may be reinforced 125 to prevent them from being separated from the peripheral edge portion 30. In another embodiment the apertures 115, FIG. 12, are reinforced 120 to prevent them from ripping when the container is loaded and has some weight to it. In another embodiment the tabs are fitted with a binding means 40 which keeps the tabs together after the container 60 is closed. This binding means can be the same as the one used on the peripheral edge 30 or the binding means can be selected from one of the other binding means which may be selected from the group consisting of: double-backed tape FIG. 8, tongue 80 and groove strips 85 (e.g., 'zip-lock'-type or equivalent fastener), FIG. 5, hook 90 and loop 95 sealing strips (e.g., 'velcro'-type or equivalent fastener), FIG. 6, adhesives 100, FIG. 7, or the like. If double-backed tape or adhesive is used it might also include a releasable strip 105 which protects the adhesive coating or tape prior to use.

Figure 14:
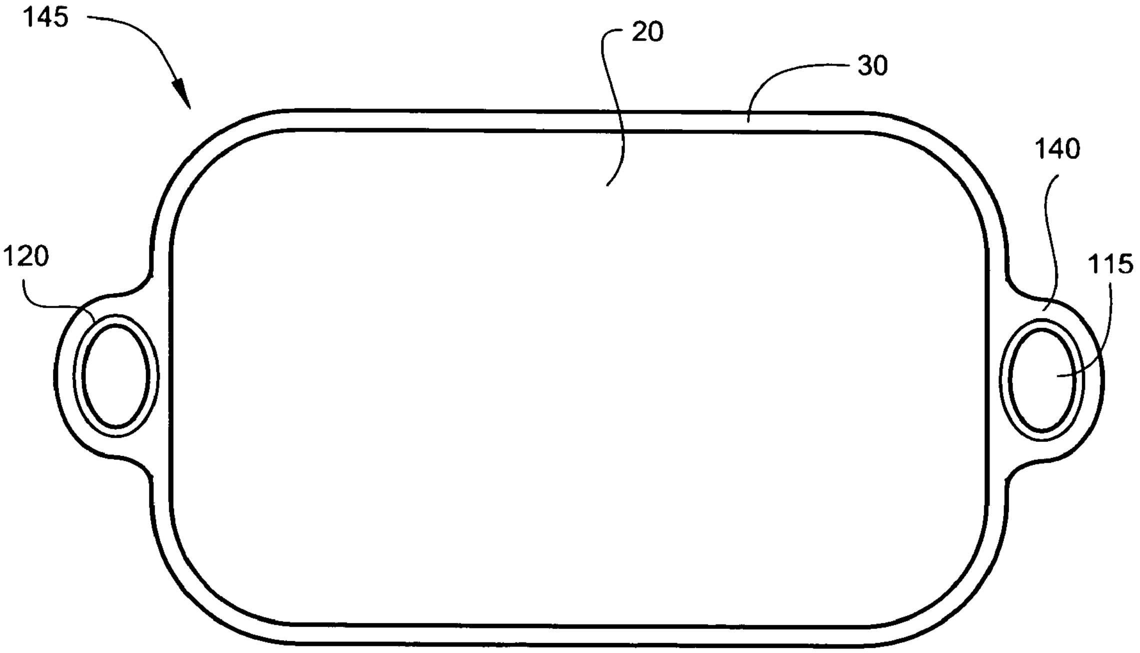
FIG. 14 is a top plan view of the sealable article container with integral handles.

In one of the embodiments of the invention the tabs 140, FIG. 14 are an integral part of the peripheral edge 30 so that the apertures 115 are form right in the peripheral edge 30, giving the sealable debris container 145 a more organic appearance. These apertures 115 may also be reinforced 120 to prevent tears when the contained 60 is weighted with an article or multiple articles.

The article or multiple articles may or may not be of a standard size or multiple articles which may be of a standard size or multiple articles which are not of a standard size. It is also possible to mix articles of a standard size with articles which are not of a standard size. An example of multiple articles which are not of a standard size or a mixture of standard and non standard sized articles is refuse 50.

The sealable article containers of the present invention can be designed and fabricated to be used as a low cost disposable item or may be made or fabricated so that they are a reusable item. One example of a reusable configuration would be to use reinforced plastic sheets such as the blue tarp with a hook and loop closure, and example of a disposable item may be a polypropylene sheet with a sealing strip. Another example would be to use a polyethylene film with an adhesive strip that would serve as a single use disposable item.

While this application uses an example of a debris container the use of the invention is much wider and can be used as an enclosure for loose articles or a single article. The flat material may have a decorative design which can be used to enclose gifts which can be used in place of gift wrap or gift bags.

What is claimed is:

1. A sealable article container comprising:

a flat material being made of a material selected from the group consisting of: a plastic film, paper sheet, foil, cloth, netting, mesh, or composites thereof; and having a peripheral edge portion around an outer edge of said flat material, said flat material being fully open;

a binding means being located about an entirety of said peripheral edge portion, said binding means configured so that fully open flat material being adapted to fold upon itself in a single fold, and said binding means being selected from the group consisting of: double-backed tape, tongue and groove strips, and hook and loop sealing strips;

said flat material having a geometric shape that forms a mirror image with itself allowing said flat material, to fold in half upon itself where said sealing means located on one half of said flat material contacting the sealing means from the opposite half, thereby allowing said flat material to be folded in half to form a container adapted to enclose debris;

said geometric shape being selected from the group consisting of: a circle, an oval, a rectangle, a square, a hexagon and an octagon;

said peripheral edge portion being fitted with a set of matching tabs;

said matching tabs being integral with said flat material;

each said tab having an aperture which match when said container is formed to provide a handle for said container;

said matching tabs being fitted with a binding means selected from the group consisting of: double-backed tape, tongue and groove strips, hook and loop sealing strips or adhesive, which secures the tabs together forming said handle; and said matching tabs being reinforced whereby said handle being adapted to lift said container adapted to enclose debris.

2. The sealable article container according to claim 1 where said plastic film is selected from the group of: transparent, opaque or colored.

3. The sealable article container according to claim 1 where said cloth is woven or non-woven.

4. The sealable article container according to claim 1 where said flat material has a pattern printed.

5. The sealable article container according to claim 1 where said netting or mesh is made from a fiber selected from the group of: natural fibers, synthetic fibers or combinations thereof.

6. The sealable article container according to claim 1 where said double-backed tape or adhesive has a releasable strip which protects that adhesive coating prior to use.

7. The sealable article container according to claim 1 where said flat material is either a single layer or a multilayer where said single layer or each multilayer is made from a material selected from the group consisting of: plastic film, paper sheet, cloth, netting, mesh or a multilayer composite of these materials.

* * * * *